(12) United States Patent
Koyama et al.

(10) Patent No.: US 11,459,199 B2
(45) Date of Patent: Oct. 4, 2022

(54) PRINTING APPARATUS

(71) Applicant: BROTHER KOGYO KABUSHIKI KAISHA, Nagoya (JP)

(72) Inventors: Keita Koyama, Nagoya (JP); Jyunji Maeda, Ichinomiya (JP); Katsunori Sakai, Toyokawa (JP); Mitsuru Nakamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 409 days.

(21) Appl. No.: 16/728,555

(22) Filed: Dec. 27, 2019

(65) Prior Publication Data

US 2020/0207565 A1 Jul. 2, 2020

(30) Foreign Application Priority Data

Dec. 28, 2018 (JP) .............................. JP2018-248677

(51) Int. Cl.
| | |
|---|---|
| *B65H 7/06* | (2006.01) |
| *H04N 1/12* | (2006.01) |
| *B41J 11/46* | (2006.01) |
| *B41J 11/00* | (2006.01) |
| *H04N 1/00* | (2006.01) |

(52) U.S. Cl.
CPC ............ *B65H 7/06* (2013.01); *B41J 11/0095* (2013.01); *B41J 11/46* (2013.01); *H04N 1/00037* (2013.01); *H04N 1/121* (2013.01)

(58) Field of Classification Search
CPC ..... B41J 13/00; B41J 11/00; B41J 2/32; B41J 11/42; B41J 3/407; B41J 11/44; B41J 2/355; B41J 21/17; B65C 9/46; B65C 9/40; G03G 15/01; G03G 15/00; B41F 17/00; B42D 5/00; B42D 5/02; G06F 15/00; G06K 1/00; G06K 15/00; G08B 13/14; G08B 23/00; G09F 3/02
USPC ......................................................... 271/258
See application file for complete search history.

(56) References Cited

U.S. PATENT DOCUMENTS

| | | | | |
|---|---|---|---|---|
| 6,680,098 | B1 * | 1/2004 | Aakermann | ............... G09F 3/10 |
| | | | | 40/310 |
| 9,560,235 | B2 * | 1/2017 | Motoyama | ........... H04N 1/0408 |
| 9,701,140 | B1 * | 7/2017 | Alaganchetty | ............. B41J 2/32 |

(Continued)

FOREIGN PATENT DOCUMENTS

| | | |
|---|---|---|
| JP | 2009-078454 A | 4/2009 |
| JP | 5000442 B2 | 8/2012 |

(Continued)

*Primary Examiner* — Negussie Worku
(74) *Attorney, Agent, or Firm* — Scully, Scott, Murphy & Presser, PC (57) ABSTRACT

There is provided a printing apparatus, including: a casing having a discharge opening and a conveyance route; a roller; a driving source; a printing head; a scanner disposed at a downstream side in a discharge direction; and a controller. The controller is configured to, depending on a printing preparation command, detect a leading-end position of a sheet; determine whether a printing surface of the sheet includes an error position that is not suitable for printing; and convey the sheet until the error position reaches the downstream position from the printing head. Then, the controller controls the printing head to execute printing of an image on the sheet.

13 Claims, 11 Drawing Sheets

(56) References Cited

U.S. PATENT DOCUMENTS

| | | | |
|---|---|---|---|
| 2006/0008311 A1* | 1/2006 | Miyasaka | B41J 11/0095 |
| | | | 400/613 |
| 2012/0081716 A1* | 4/2012 | Horade | G03G 15/6561 |
| | | | 358/1.5 |
| 2014/0267480 A1* | 9/2014 | Yoshida | B41J 2/04593 |
| | | | 347/10 |
| 2015/0029290 A1* | 1/2015 | Watanabe | B41J 11/04 |
| | | | 347/218 |
| 2017/0036471 A1* | 2/2017 | Biffert | B41J 3/01 |
| 2018/0001675 A1* | 1/2018 | Handa | G06K 15/404 |
| 2018/0079235 A1* | 3/2018 | Alaganchetty | B41J 11/0095 |
| 2018/0281475 A1* | 10/2018 | Unemyr | B41J 2/32 |
| 2019/0070863 A1* | 3/2019 | Ho | B41J 2/362 |
| 2019/0337303 A1* | 11/2019 | Ho | B41J 2/362 |
| 2021/0206176 A1* | 7/2021 | Matsuda | B41J 11/46 |
| 2022/0001680 A1* | 1/2022 | Kuniya | B41J 11/0095 |

FOREIGN PATENT DOCUMENTS

| | | |
|---|---|---|
| JP | 5146175 B2 | 2/2013 |
| JP | 2013-111868 A | 6/2013 |

\* cited by examiner

PRINTING APPARATUS

CROSS REFERENCE TO RELATED APPLICATION

The present application claims priority from Japanese Patent Application No. 2018-248677 filed on Dec. 28, 2018, the disclosure of which is incorporated herein by reference in its entirety.

BACKGROUND

Field of the Invention

The present disclosure relates to a printing apparatus such as a label printer.

Description of the Related Art

There is conventionally known a printer in which a roll of sheet obtained by making a long sheet into a roll is used and an image is printed in printing areas (labels) arranged in a longitudinal direction of the sheet. When the roll of sheet is replaced, for example, a user performs cueing of the sheet in which a leading end of the printing area is aligned with a position of a printing head. Further, there is known a printer in which a mark provided in a sheet in advance is detected and cueing is automatically performed.

SUMMARY

Kinds of the roll of sheet include an inward-rolled sheet that is rolled so that a printing surface faces inside, and an outward-rolled sheet that is rolled so that a printing surface faces outside. The outward-rolled sheet may have damage and/or dirt on its printing surface by handling by a user, contact with other goods, and the like. When the printing surface has damage and/or dirt, conventional printers perform printing of an image also in the area having the damage and/or dirt.

When a used roll of sheet that is not new is set in a printer, a leading end of the sheet may include an area for which printing has been performed. Printing may be accidentally performed over the area for which printing performed.

An object of the present disclosure is to provide a printing apparatus that inhibits printing of an image in an area having damage and/or dirt and an area for which printing has been performed.

According to an aspect of the present disclosure, there is provided a printing apparatus, including: a casing having a discharge opening and a conveyance route connected to the discharge opening; a roller configured to convey along the conveyance route a sheet that is set in the casing; a driving source configured to drive the roller; a printing head facing the sheet positioned in the conveyance route; a scanner facing the conveyance route at a downstream from the printing head in a discharge direction in which the sheet is conveyed toward the discharge opening along the conveyance route, and configured to scan a printing surface of the sheet; and a controller. The controller is configured to, in response to a printing preparation command, detect a leading-end position of the sheet, identify an error position in which at least one of printing or damage is present on the printing surface of the sheet in a case that scan data obtained by the scanner include data corresponding to the at least one of printing or damage, control the driving source to drive the roller to convey the sheet in the discharge direction until the error position reaches a downstream position from the printing head, and control the printing head to execute printing of an image on the sheet, after the sheet is conveyed in the discharge direction until the error position reaches the downstream position from the printing head.

The above configuration inhibits printing of an image on an area having damage and/or dirt and an area for which printing has been executed.

BRIEF DESCRIPTION OF THE DRAWINGS

FIGS. 7A to 7D are cross-sectional views of the label printer 1 executing the printing-related processing, wherein FIG. 7A depicts a state immediately after a sheet (a roll of sheet) is set in the label printer 1, FIG. 7B depicts a state in which the sheet is conveyed in a rewinding direction, FIG. 7C depicts a state in which a leading end of the sheet is detected, and FIG. 7D depicts a state in which a position of the sheet is adjusted so that the sheet is positioned at a printing start position.

DESCRIPTION OF THE EMBODIMENTS

Referring to the drawings, an embodiment of the present disclosure is explained below.

<Label Printer>

Figure 1:
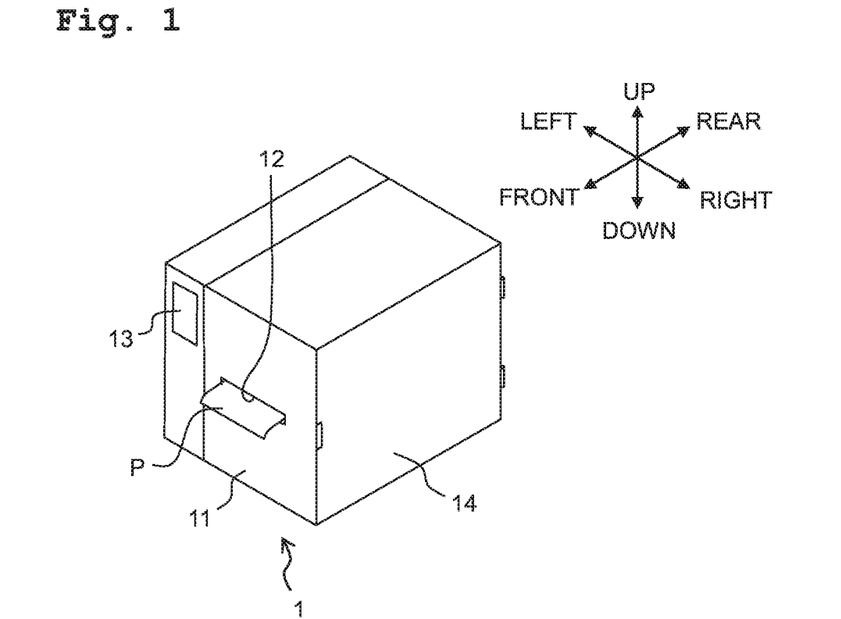
FIG. 1 is a perspective view of a label printer 1, wherein an cover is closed.
Figure 2:
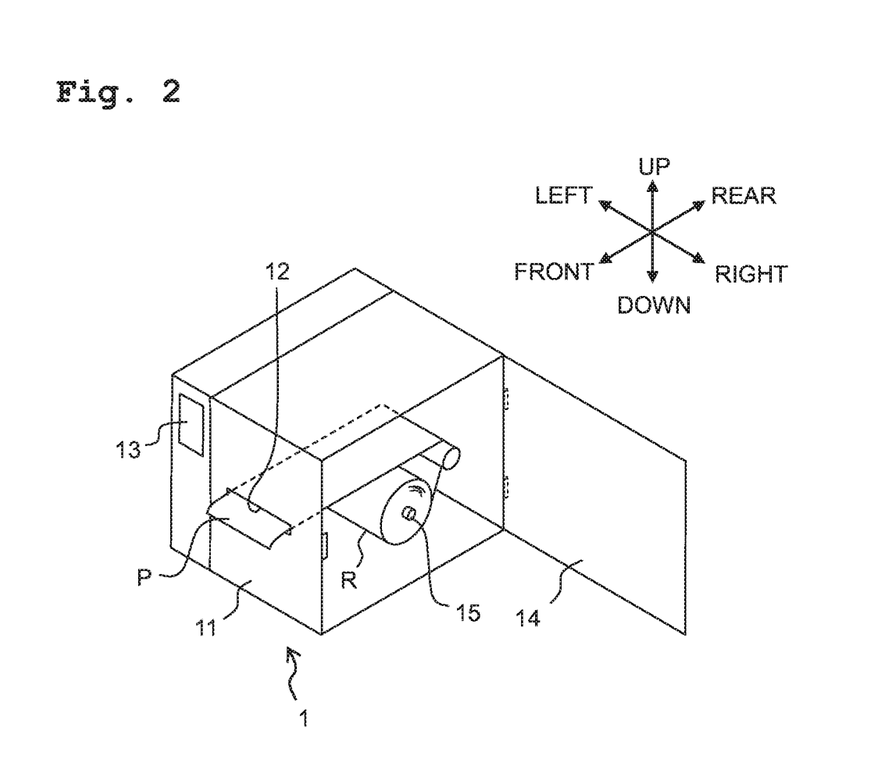
FIG. 2 is a perspective view of the label printer 1, wherein the cover is open.

FIGS. 1 and 2 depict a label printer 1 that is an exemplary printing apparatus. The label printer 1 includes a casing 11 that is an external portion of the label printer 1. A discharge opening 12 from which a sheet P is discharged is formed on a lateral surface (front surface) of the casing 11.

In the following, a first side of the casing 11 on which the discharge opening 12 is opened is defined as a front side, and a second side of the casing 11 opposite to the first side is defined as a rear side. Left and right sides of the label printer 1 are defined based on a state where the label printer 1 is seen from the front side. A direction orthogonal to the front-rear direction and the left-right direction is an up-down direction. Upper and lower sides of the label printer 1 are defined based on a state where the label printer 1 is placed on a horizontal surface.

The discharge opening 12 is a rectangular opening extending in the left-right direction. The inside of the casing 11 communicates with the outside of the casing 1 through the discharge opening 12. A touch panel 13 is provided on a front surface of the casing 11 at the left side of the discharge opening 12. Images including a variety of information, operation keys, and the like are displayed on the touch panel 13. When a user pushes (touches) an operation key displayed on the touch panel 13, an instruction or setting corresponding to the operation key is received by the touch panel 13. A signal depending on the operation is output from the touch panel 13.

As depicted in FIG. 2, a right surface of the casing 11 is open. The casing 11 includes a cover 14 by which the right surface is opened or closed. When the cover 14 is opened, the right surface of the casing 11 is open to expose the inside of the casing 11. When the cover 14 is closed, the right surface of the casing 11 is closed.

Figure 3:
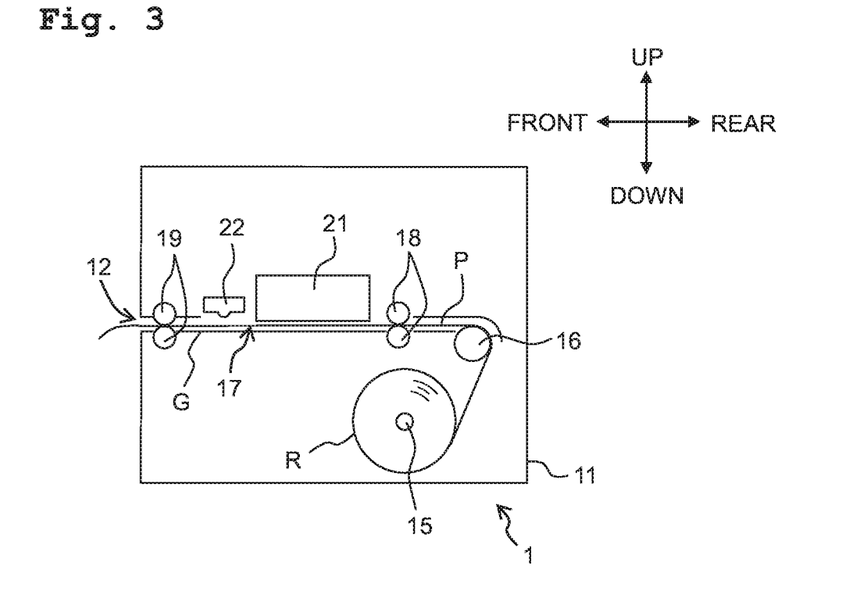
FIG. 3 is a cross-sectional view of an internal configuration of the label printer 1.
Figure 4:
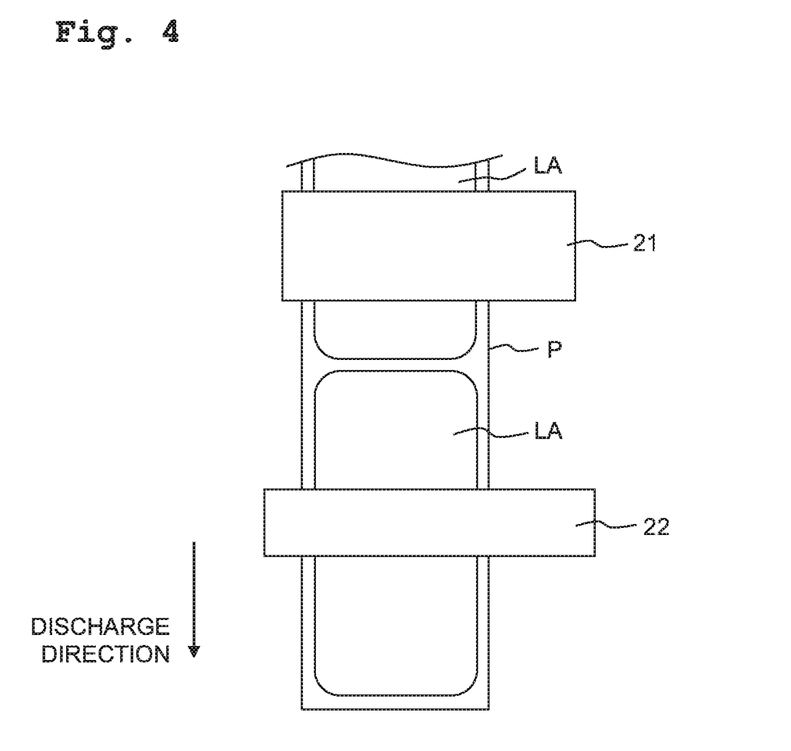
FIG. 4 is a plan view of the internal configuration of the label printer 1 and depicts a state in which a sheet is conveyed in a discharge direction.

As depicted in FIGS. 2 and 3, the casing 11 includes a roll holder 15 holding a sheet roll R (a roll of sheet R). The sheet roll R is formed by winding a long sheet P around a roll core. As depicted in FIG. 4, the sheet P may be a label sheet (a die-cut label sheet) having printing areas LA arranged in its longitudinal direction or a continuous sheet having no printing areas LA. The label sheet may be a sheet in which frames defining printing areas LA are printed on a printing surface of a long regular sheet, or a sheet in which an adhesive sheet overlaps with a long releasing sheet and punched labels are formed on the adhesive sheet so that the punched labels are arranged in its longitudinal direction. In the latter label sheet, a printing surface of each label (an opposite surface of the adhesive surface) corresponds to the printing area LA. When the sheet P is the label sheet, the sheet P is wound around the roll core so that the printing surface faces outside. As depicted in FIGS. 2 and 3, the roller holder 15 has a substantially cylindrical shape. The sheet roll R is held by the roll holder 15 by inserting the roll holder 15 into the roll core of the sheet roll R.

The casing 11 includes a direction chancing roller 16 that is positioned above the roller holder 15 at the rear side of the roll holder 15. As depicted in FIG. 3, the sheet P is conveyed through a conveyance route 17. The conveyance route 17 is defined by a guide G. The guide G forming the conveyance route 17 extends frontward from a position above the direction changing roller 16 and reaches the discharge opening 12. Namely, the sheet P is pulled out from the sheet roll R toward the rear side of the direction changing roller 16. The conveyance direction of the sheet P is changed by causing the sheet P to extend along a circumferential surface of the direction changing roller 16. The sheet P is thus conveyed frontward along the conveyance route 17 toward the discharge opening 12.

Two conveyance roller pairs 18 and 19 (exemplary rollers) conveying the sheet P are provided on the conveyance route 17. Rollers of the conveyance roller pair 18 are disposed on the front side of the direction changing roller 16 at an interval. Rollers of the conveyance roller pair 19 are disposed on the rear side of the discharge opening 12 at an interval and on the front side of the conveyance roller pair 18 at an interval. Power of a motor M (see FIG. 5) is transmitted to the respective conveyance roller pairs 18 and 19 with the sheet P interposed between the two rollers forming the conveyance roller pair 18 and the two rollers forming the conveyance roller pair 19, thereby rotating the conveyance roller pairs 18 and 19. The sheet P is thus conveyed in the discharge direction so that the sheet P goes along the conveyance route 17 toward the discharge opening 12. The power of the motor M can be transmitted to the roller holder 15 so that the roll core of the sheet roll R rotates in a direction reversed to the case in which the sheet P is conveyed in the discharge direction. In that case, the sheet P is conveyed in a rewinding direction that is reversed to the conveyance direction. When the sheet P is conveyed in the rewinding direction, the conveyance roller pairs 18 and 19 can rotate freely.

A printing head 21 and a scanner 22 are arranged in that order from an upstream side in the discharge direction so that they are positioned between the conveyance roller pairs 18 and 19.

The printing head 21 is disposed on the upper side of the conveyance route 17 and faces the conveyance route 17. For example, the printing head 21 prints an image on a printing surface of the sheet P conveyed on the conveyance route 17 in accordance with a thermal transfer system.

The scanner 22 is disposed at a downstream side of the printing head 21 in the discharge direction. The scanner 22 is disposed on the upper side of the conveyance route 17 and faces the conveyance route 17. The scanner 22 reads, for example, the printing surface of the sheet P conveyed on the conveyance route 17 by use of a Contact Image Sensor (CIS). The scanner 22 is exemplified, for example, by a scanner incorporating a light source, a rod lens array, and a linear image sensor. Linear light is emitted from the light source toward the printing surface of the sheet P and the light reflected by the printing surface becomes incident on the linear image sensor through the rod lens array. This causes the document to be read in a main scanning direction by one line.

<Main Components of Electrical Configuration>

Figure 5:
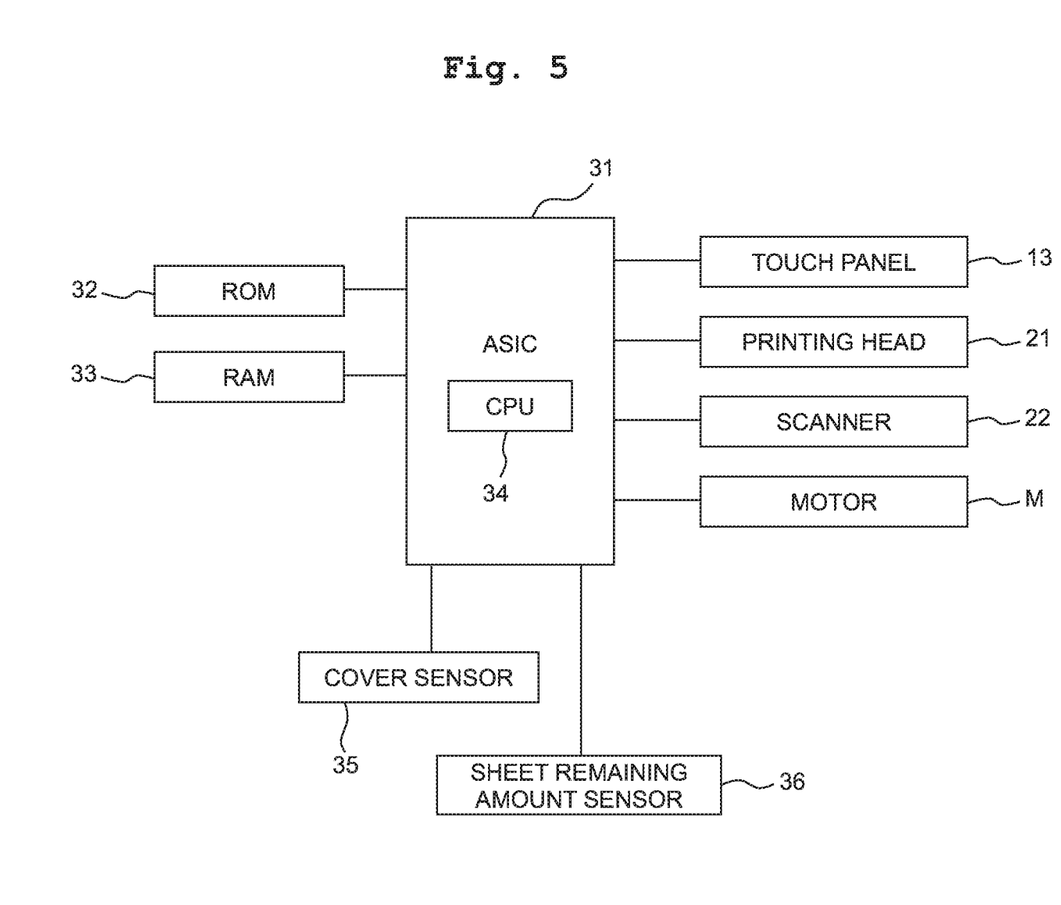
FIG. 5 is a block diagram depicting an electrical configuration of the label printer 1.

As depicted in FIG. 5, the label printer 1 includes an Application Specific Integrated Circuit (ASIC) 31, a Read Only Memory (ROM) 32, and a Random Access Memory (RAM) 33.

The ASIC 31 includes a CPU 34 (an exemplary controller). The CPU 34 controls respective components including the touch panel 13, the printing head 21, the scanner 22, and the motor M by executing programs for a variety of processing based on information input to the ASIC 31. The motor M is a driving source of the conveyance roller pairs 18 and 19.

The ROM 32 is a rewritable non-volatile memory, such as a flash memory. The ROM 32 stores programs and a variety of data executed by the CPU 34.

The RAM 33 (an exemplary memory) is a volatile memory such as a Dynamic Random Access Memory (DRAM). The RAM 33 is used as a work area when the CPU 34 executes programs. A step counter is configured by the RAM 33. The step counter increments (+1) a step count every time a motor 26 is driven by one step. The CPU 34 controls the position of the sheet P by controlling the driving of the motor M based on the step number counted by the step counter.

A detection signal of a cover sensor 35 for detecting the opening and closing of the cover 14 and a detection signal of a sheet remaining amount sensor 36 for detecting a remaining amount of the sheet P in the sheet roll R are input to the ASIC 31.

The cover sensor 35 may be a mechanical switch including an actuator. The cover sensor 35 outputs a detection signal at an ON level when the actuator is pushed by the closed cover 14. The cover sensor 35 outputs a detection signal at an OFF level when the cover 14 is open and the actuator is not pushed thereby. When the cover sensor 35 has output the detection signal at the ON level, the ASIC 31 determines that the cover 14 is closed. When the cover sensor 35 has output the detection signal at the OFF level, the ASIC 31 determines that the cover 14 is open.

The sheet remaining amount sensor 36 is disposed to face a circumferential surface of the sheet roll R. The sheet remaining amount sensor 36 outputs a detection signal depending on a distance between the sheet remaining amount sensor 36 and the circumferential surface of the sheet roll R. The distance between the sheet remaining amount sensor 36 and the circumferential surface of the sheet roll R decreases as the diameter of the circumferential surface of the sheet roll R increases, namely, the amount of the sheet P wound around the sheet roll R is larger. Based on the distance therebetween, the detection signal of the sheet remaining amount sensor 36 changes. The ASIC 31 detects (estimates) the amount of the sheet P remained in the sheet roll R based on the detection signal of the sheet remaining amount sensor 36.

<Printing-related Processing>

Figure 6A:
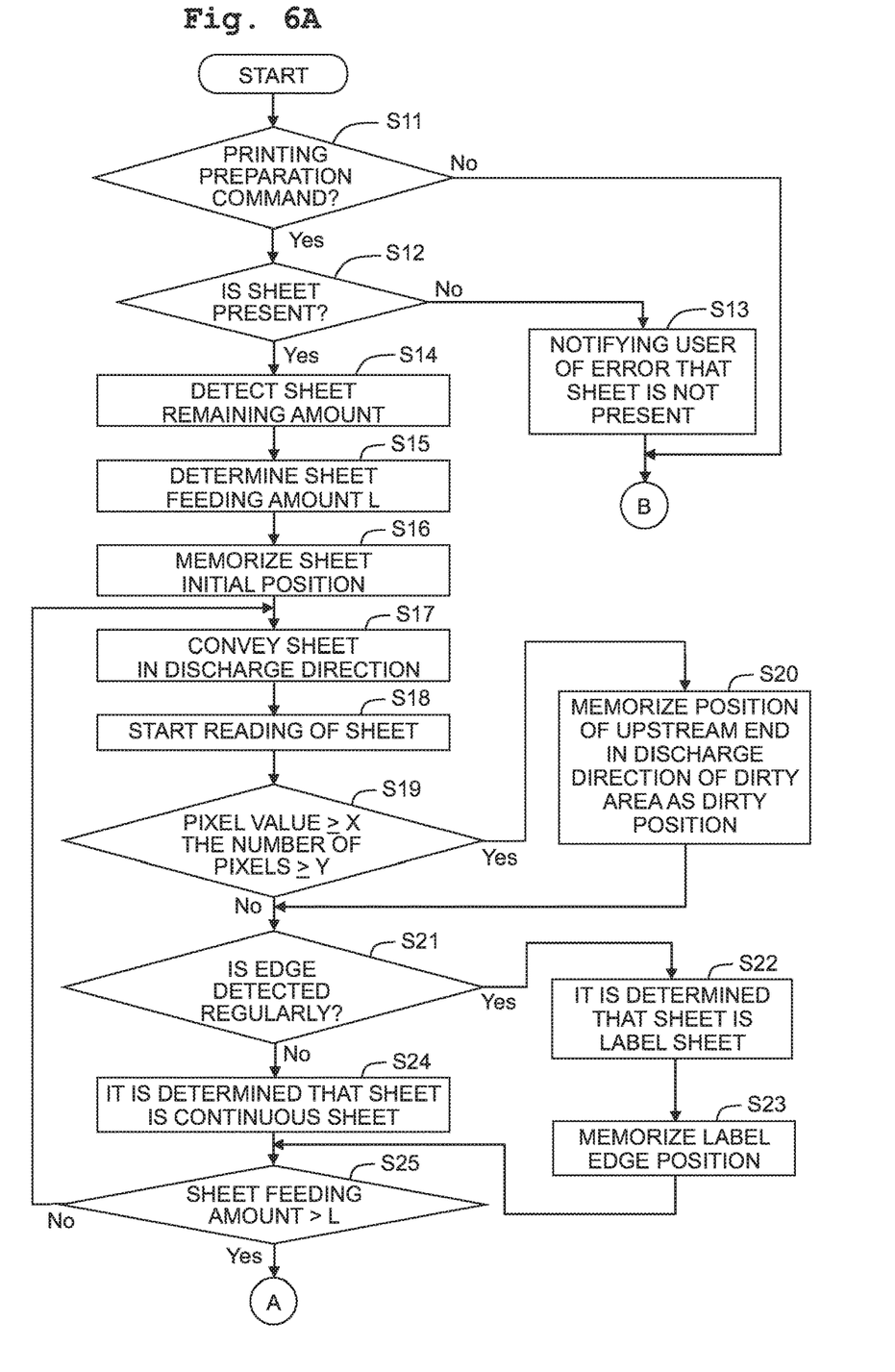
FIGS. 6A, 6B and 6C are flowcharts indicating printing-related processing.
Figure 6B:
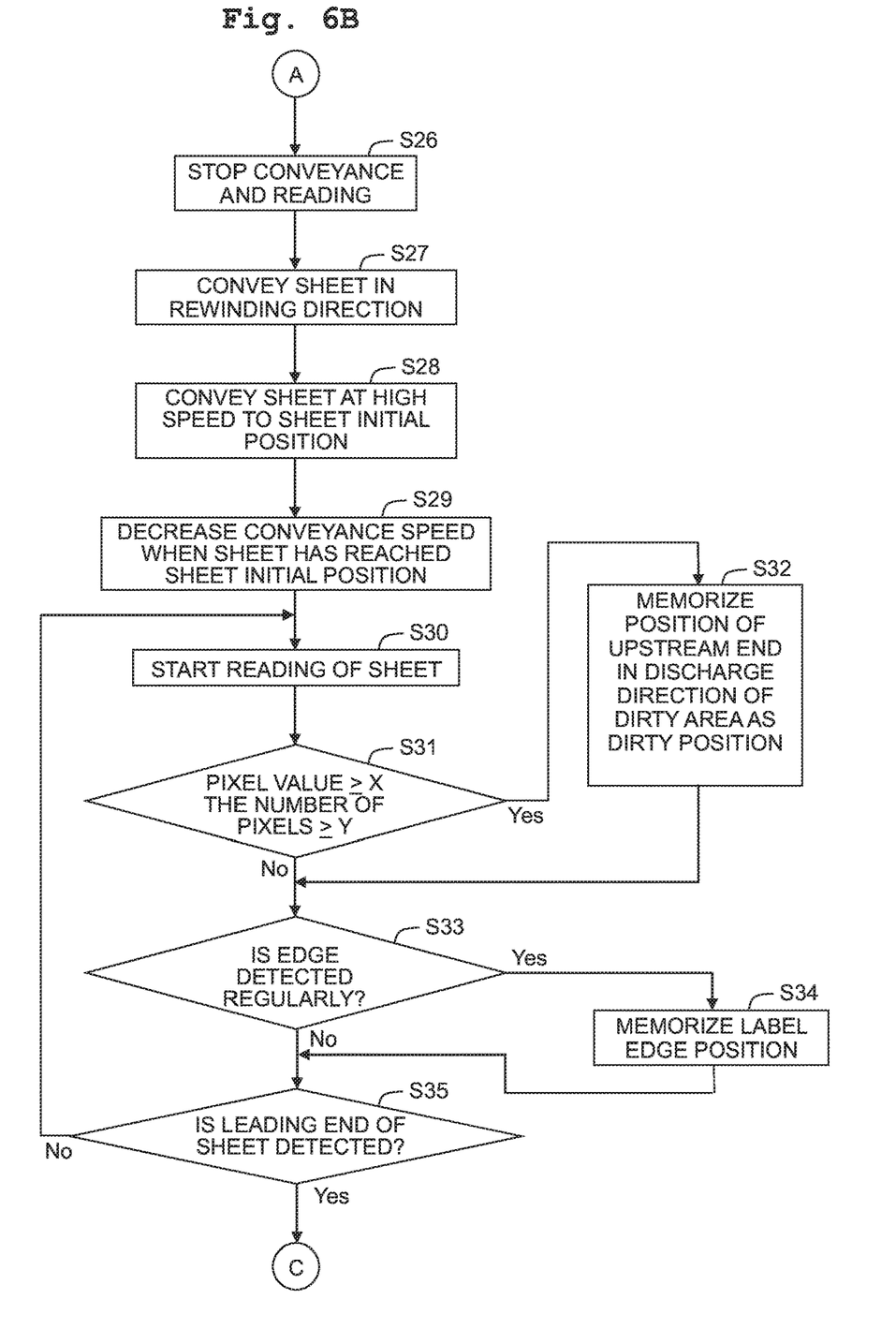
Figure 6C:
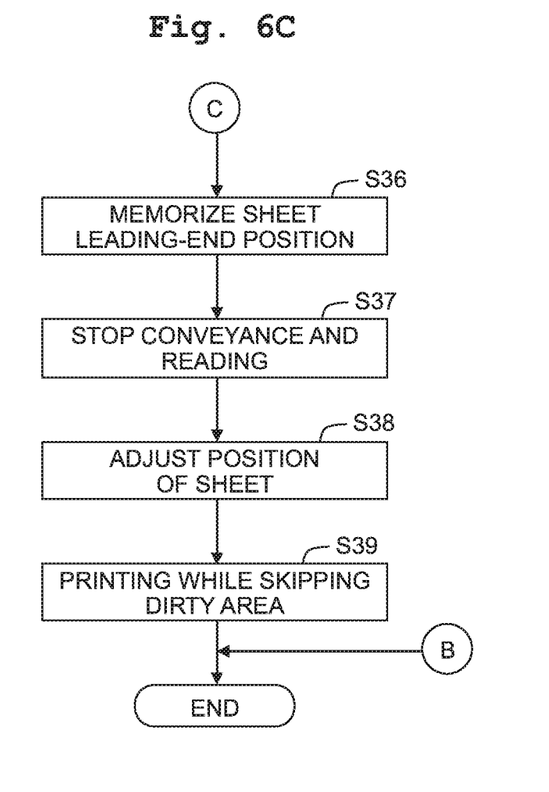

The CPU 34 of the ASIC 31 executes printing-related processing depicted in FIGS. 6A to 6C in a predefined cycle.

In the printing-related processing, the CPU 34 first determines whether a printing preparation command is generated (S11), as depicted in FIG. 6A. The printing preparation command is generated in the ASIC 31, for example, when the cover 14 is closed and the level of the detection signal of the cover sensor 35 is changed from the OFF level to the ON level.

When the printing preparation command is generated (S11: YES), the CPU 34 determines whether the sheet P is present (S12). The presence or absence of the sheet P can be determined, for example, from the detection signal of the sheet remaining amount sensor 36. Namely, when the CPU 34 has deduced based on the detection signal of the sheet remaining amount sensor 36 that the remaining amount of the sheet P in the sheet roll R is equal to or less than a predefined amount (including zero), the CPU 34 can determine that the sheet P is not present. When the sheet roll R is not held by the roll holder 15, the distance from the sheet remaining amount sensor 36 is longer than a case in which the remaining amount of the sheet P in the sheet roll R is equal to or less than the predefined amount. As described above, the sheet remaining amount sensor 36 outputs the detection signal depending on the distance between the sheet remaining amount sensor 36 and the circumferential surface of the sheet roll R. This allows the CPU 34 to determine that the sheet roll R is not held by the roll holder 15 based on the detection signal of the sheet remaining amount sensor 36. In that case also, the CPU 34 determines that no sheet P is present.

When the sheet P is not present (S12: NO), the CPU 34 outputs to the touch panel 13 an error display notifying a user of the fact that the sheet P is not present (S13). Then, the printing-related processing is completed.

When the sheet P is present (S12: YES), the CPU 34 detects the remaining amount of the sheet P based on the detection signal of the sheet remaining amount sensor 36 (S14). The CPU 34 determines a sheet feeding amount L depending on the remaining amount of the sheet P (S15). The sheet feeding amount L is set, for example, to a length of the sheet P corresponding to an outermost periphery of the sheet roll R, namely, a circumferential length of the outermost periphery of the sheet roll R. There is a certain relationship between the remaining amount of the sheet P and the circumferential length of the outermost periphery of the sheet roll R. The CPU 34 thus determines the sheet feeding amount L depending on the remaining amount of the sheet P in accordance with the certain relationship.

Figure 7A:
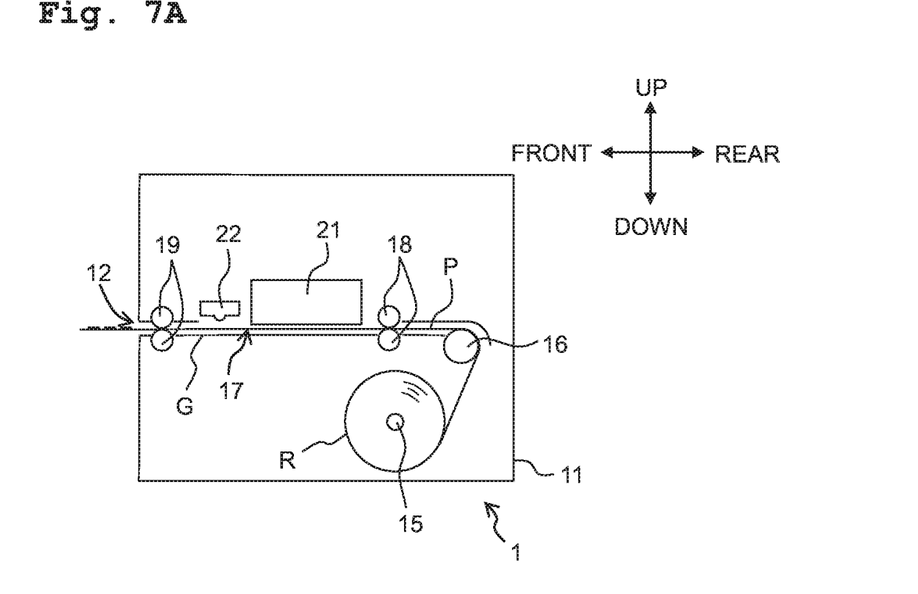

The CPU 34 causes the RAM 33 to memorize a current rotation position (step position) of the motor M as a sheet initial position of the sheet P (S16). When the sheet roll R is replaced, as depicted in FIG. 7A, a new sheet roll R is set so that the leading end of the sheet P extends beyond a nipping position where the sheet P is nipped by the conveyance roller pair 19 and extends frontward through the discharge opening 12.

After that, the CPU 34 controls the driving of the motor M to cause the conveyance roller pairs 18 and 19 to convey the sheet P in the discharge direction (S17). The CPU 34 causes the scanner 22 to start reading of the printing surface of the sheet P simultaneously with the start of conveyance of the sheet P (S18). The scanner 22 reads the printing surface of the sheet P by every one line, and outputs data (line data) corresponding to the one line read. The CPU 34 causes the RAM 33 to memorize the line data, which is output from the scanner 22 every time one line is read.

After the line data is memorized in the RAM 33, the CPU 34 determines, from the line data memorized, the number of pixels each having a pixel value (density value) of equal to or more than a predefined threshold value X. The CPU 34 then determines a moving average of the number of pixels each having a pixel value of equal to or more than the threshold value X. Namely, the CPU 34 determines an average value of the number of pixels that is determined from line data corresponding to multiple lines that include line data obtained most recently and that have a pixel value of equal to or more than the threshold value X. Then, the CPU 34 determines whether the moving average of the number of pixels having a pixel value of equal to or more than the threshold value X is equal to or more than a threshold value Y (S19).

When the moving average of the number of pixels having a pixel value of equal to or more than the threshold value X is equal to or more than the threshold value Y (S19: YES), the CPU 34 sets an area including the line that corresponds to the line data used for calculating the moving average as a dirty area. Then, the CPU 34 causes the RAM 33 to memorize a position of an upstream end in the discharge direction of the dirty area as a dirty position (S20).

The CPU 34 determines whether an edge is detected regularly (S21) through a publicly-known edge detection method in which differential processing is performed using the line data output from the scanner 22 sequentially.

When the edge is detected regularly (S21: YES), the CPU 34 determines (S22) that the sheet P is the label sheet (die-cut label sheet). Then, the CPU 34 causes the RAM 33 to memorize a position (label edge position) of the edge detected regularly (S23). When the edge is not detected regularly (S21: NO), the CPU 34 determines that the sheet P is the continuous sheet (S24).

The CPU 34 determines whether the conveyance amount in the discharge direction of the sheet P, namely, the sheet feeding amount in the discharge direction exceeds the sheet feeding amount L (S25). The conveyance in the discharge direction of the sheet P is continued until the sheet feeding amount in the discharge direction exceeds the sheet feeding amount L (S25: NO). When the sheet feeding amount in the discharge direction exceeds the sheet feeding amount L (S25: YES), the CPU 34 stops the driving of the motor M to stop the conveyance of the sheet P in the discharge direction. Further, the CPU 34 causes the scanner 22 to stop the reading of the printing surface of the sheet P (S26).

Figure 7B:
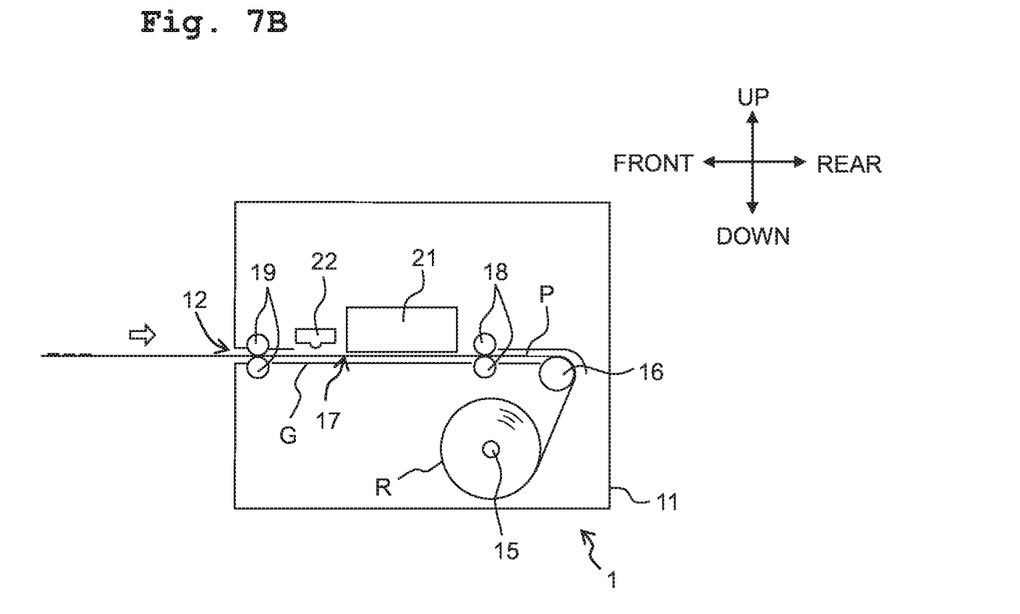

After that, the CPU 34 controls the driving of the motor M to convey the sheet P in the rewinding direction, as depicted in FIG. 7B (S27). The conveyance of the sheet P in the rewinding direction is performed at high speed until the sheet P returns to the sheet initial position. The scanner 22 does not read the printing surface during conveyance at high speed (S28). When the position of the sheet P has returned to the sheet initial position, the conveyance speed of the sheet P in the rewinding direction is reduced to a conveyance speed at which the scanner 22 reads the printing surface (S29).

The CPU 34 causes the scanner 22 to start the reading of the printing surface of the sheet P in synchronization with the decrease in the conveyance speed in the rewinding direction (S30). The scanner 22 reads the printing surface of the sheet P by every one line, and outputs line data every time one line is read. The CPU 34 causes the RAM 33 to memorize the line data output from the scanner 22.

After the line data is stored in the RAM 33, the CPU 34 determines, from the line data memorized, the number of pixels having a pixel value of equal to or more than the predefined threshold value X and the moving average of the number of pixels having a pixel value of equal to or more than the predefined threshold value X, similarly to the step S19. The CPU 34 determines whether the moving average of the number of pixels having a pixel value of equal to or more than the predefined threshold value X is equal to or more than the predefined threshold value Y (S31).

When the moving average of the number of pixels having a pixel value of equal to or more than the predefined threshold value X is equal to or more than the threshold value Y (S31: YES), the CPU 34 determines an area including the line that corresponds to the line data used for calculating the moving average as the dirty area. Then, the CPU 34 causes the RAM 33 memorize a position of an upstream end in the discharge direction of the dirty area as the dirty position (S32).

The CPU 34 determines whether an edge is detected regularly (S33) through the publicly-known edge detection method in which differential processing is performed using the line data output from the scanner 22 sequentially.

When the edge is detected regularly (S33: YES), the CPU 34 causes the RAM 33 to memorize the position of the edge detected regularly (S34).

Figure 7C:
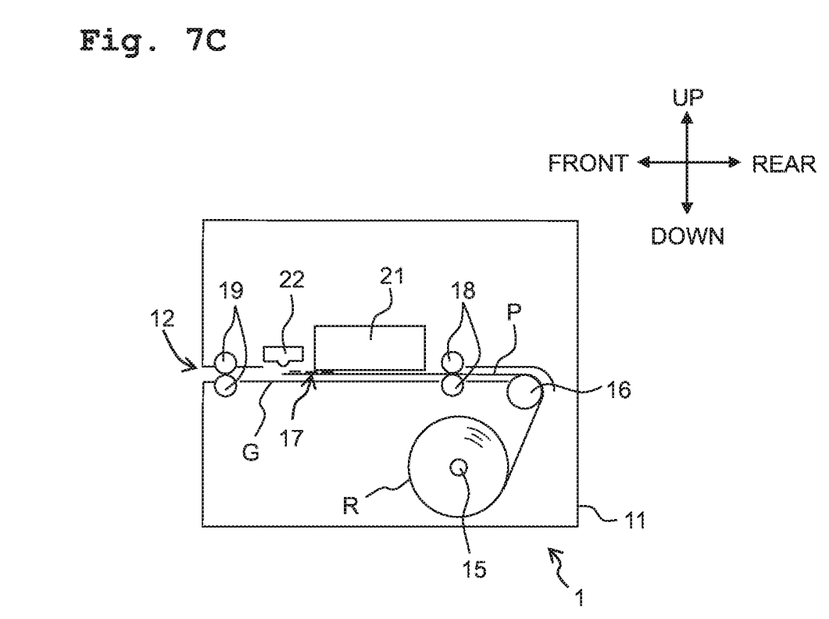

Then, the CPU 34 determines whether the leading end of the sheet P is detected (S35). As depicted in FIG. 7C, when the leading end of the sheet P goes beyond the reading position of the scanner 22 in the rewinding direction, the printing surface of the sheet P is not read by the scanner 22. The leading end of the sheet P is thus detected from the line data. The conveyance in the rewinding direction of the sheet P is continued until the CPU 34 detects the leading end of the sheet P (S35: NO). When the CPU 34 has detected the leading end of the sheet P (S35: YES), the CPU 34 causes the RAM 33 to memorize a rotation position (step position) of the motor M at the time of detection as a sheet leading-end position of the leading end of the sheet P (S36). When the CPU 34 has detected the leading end of the sheet P, the CPU 34 stops the conveyance of the sheet P in the rewinding direction. Further, the CPU 34 causes the scanner 22 to stop the reading of the printing surface of the sheet P (S37).

Figure 7D:
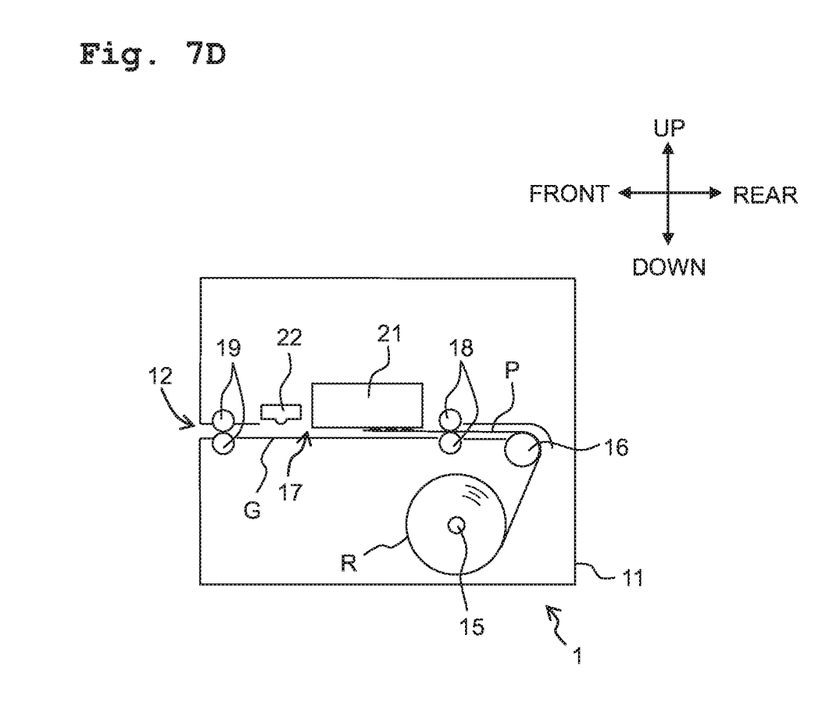

When the sheet P is the label sheet, the CPU 34 causes the RAM 33 to memorize information of the printing areas (labels) LA including no dirty area as area information based on information about the sheet leading-end position, the label edge position, and the dirty position memorized in the RAM 33. Then, as depicted in FIG. 7D, the CPU 34 controls the driving of the motor M to adjust the position of the sheet P so that printing is started from a printing area LA that is included in the printing areas LA (labels) including no dirty area and that is the closest to the leading end of the sheet P (S38: cueing processing).

When the sheet P is the continuous sheet, the CPU 34 causes the RAM 33 to memorize the length of the dirty area in the discharge direction as the area information based on information about the sheet leading-end position and the dirty position memorized in the RAM 33. The CPU 34 sets an area including no dirty area and having a certain length in the discharge direction of the printing surface of the sheet P as the printing area LA based on the area information. Then, the CPU 34 controls the driving of the motor M to adjust the position of the sheet P so that printing is started from a printing area LA that is included in the printing areas LA and that is the closest to the leading end of the sheet P (S38).

When the printing instruction is input from the touch panel 13 to the ASIC 31, the CPU 34 prints an image in the printing area LA including no dirty area while skipping the dirty area of the printing surface of the sheet P (when the sheet P is the label sheet, the printing area LA including the dirty area is skipped). Then, the CPU 34 ends the printing-related processing.

<Action and Effect>

As described above, the area having damage and/or dirt and the area for which printing has been performed of the printing surface of the sheet P are determined as the dirty areas, and an image is performed on the printing area LA including no dirty area while the dirty area(s) is/are skipped. This inhibits any image from being printed on the printing area LA including the dirty area. For example, the dirty area may include an area in which damage (a hole and/or a dent and/or a dirt, for example) is present, further, the dirty area may include an area in which printing has been performed. Thus, the dirty area means an area that is not suitable for printing. In other words, the dirty area means an error position that is not suitable for printing.

The detection (determination) of the dirty area on the printing surface of the sheet P is performed based on a proportion or percentage of the pixels exceeding a predefined density value. Specifically, the number of pixels having a pixel value of equal to or more than the predefined threshold value X is determined by every one line. The moving average of the number of pixels having a pixel value of equal to or more than the threshold value X is determined. When the moving average is equal to or more than the predefined threshold value Y, the area corresponding to the line data used for calculating the moving average is determined as the dirty area. The dirty area is thus determined accurately.

The leading end of the sheet P is detected after the dirty area is detected on the printing surface of the sheet P. The dirty area, however, may not be present on the printing surface. In that case, immediately after the leading end is detected, the position of the leading end of the sheet P can be adjusted (can be subjected to cueing) so that the leading end is positioned at a printing start position of the printing head 21.

When the leading end of the sheet P is detected, the conveyance speed of the sheet P is set at high speed until the sheet P returns to the sheet initial position. When the sheet P has returned to the sheet initial position, the conveyance speed of the sheet P decreases. Accordingly, when the leading end of the sheet P has arrived at the reading position of the scanner 22, and immediately after the leading end of the sheet P is detected, the conveyance of the sheet P in the rewinding direction is stopped. This inhibits the leading end of the sheet P from being needlessly returned to the position of the printing head 21, and consequently inhibits paper jam which may otherwise be caused when the sheet P is rewound needlessly.

The conveyance amount in which the sheet P is conveyed from the sheet initial position in the discharge direction to detect the dirty area on the printing surface of the sheet P is set to a length of the sheet P corresponding to an outermost periphery of the sheet roll R. This allows the CPU 34 to detect the presence or absence of the dirty area over an entire area of the outermost periphery of the sheet roll R, inhibiting printing on the printing area LA having the dirty area.

<Printing Position Adjustment>

Figure 8:
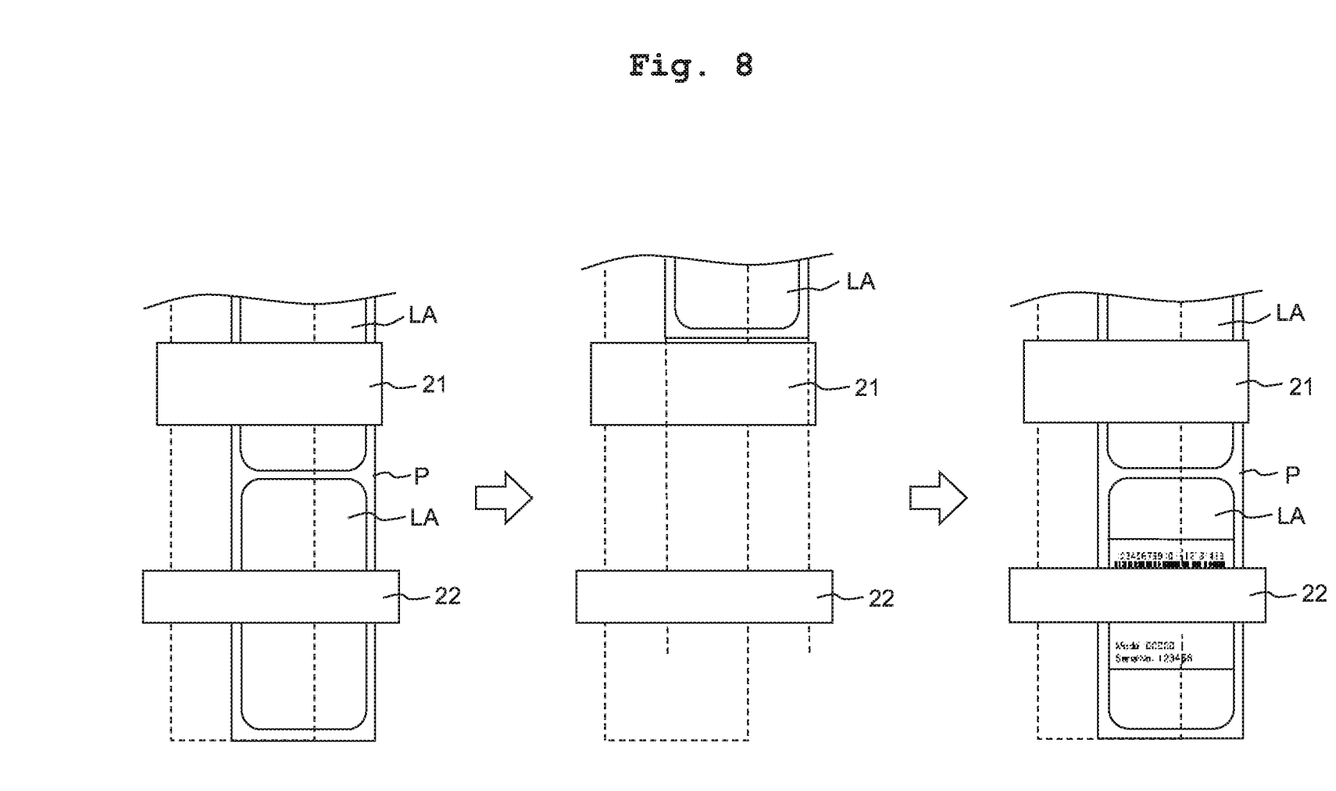
FIG. 8 illustrates adjustment in a width direction of a printing position.

As depicted in FIG. 8, when the sheet roll R is replaced in the label printer 1, the sheet roll R may be set in a state of being shifted from a proper position indicated by broken lines in a width direction orthogonal to the longitudinal direction and a thickness direction of the sheet P.

When the scanner 22 reads the printing surface of the sheet P in the printing-related processing, the CPU 34 of the ASIC 31 detects a position in the width direction of the sheet P in the conveyance route 17 based on line data obtained from the reading. When an image is printed on the sheet P, the position where printing is performed by the printing head 21 is adjusted depending on the position in the width direction of the sheet P so that a center portion in the width direction of the area where printing is performed by the printing head 21 is aligned with a center potion in the width direction of the sheet P.

Accordingly, an image is printed in the printing area LA of the sheet P without being shifted in the width direction.

<Other Examples of Printing-related Processing>

In the printing-related processing, an image is printed in the printing area LA including no dirty area (step S39 in FIG. 6B) by skipping the dirty area of the printing surface of the sheet P (when the sheet P is the label sheet, the printing area LA including the dirty area is skipped).

Figure 9A:
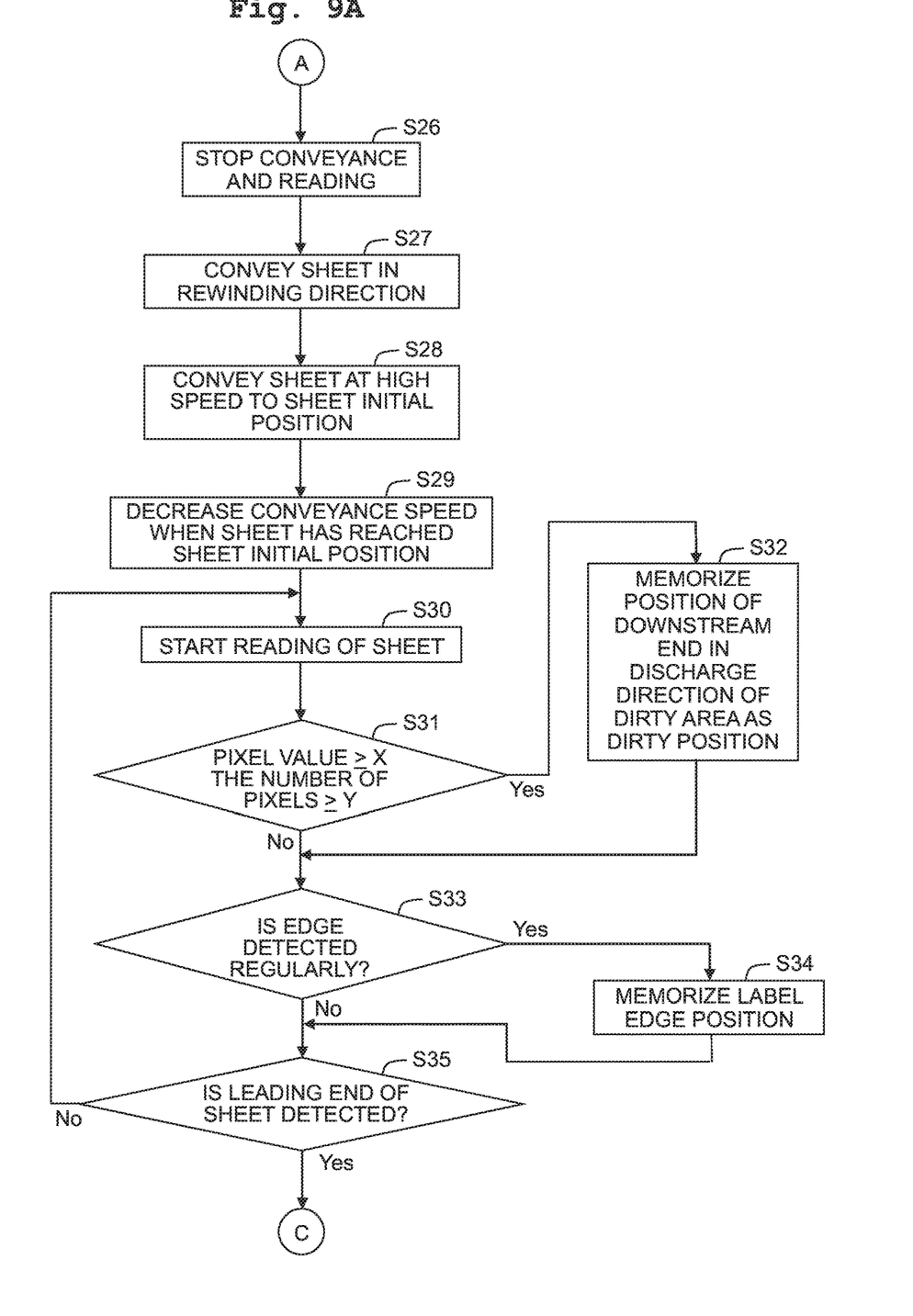
FIGS. 9A and 9B are flowcharts indicating another example of the printing-related processing.
Figure 9B:
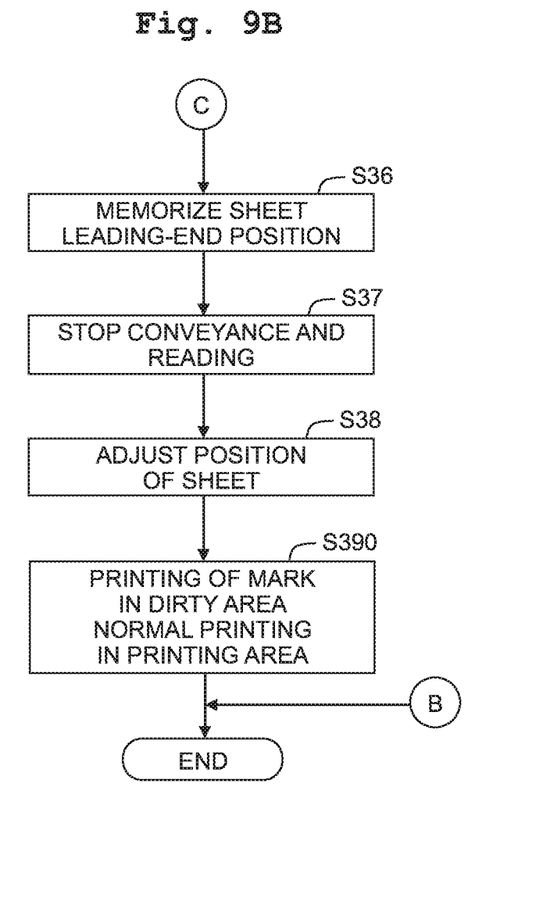

Instead of the above configuration, as depicted in FIGS. 9A and 9B, a mark indicating that the printing area is unusable because printing is already performed on the printing surface or the printing surface has damage and/or dirt, may be printed in the dirty area of the printing surface of the sheet P (the printing area LA including the dirty area when the sheet P is the label sheet). An image depending on the printing instruction may be printed in the printing area LA including no dirty area. This allows a user to be notified of the reason why an image is not printed in the dirty area.

MODIFIED EXAMPLES

The embodiment of the present disclosure is explained above. The present disclosure, however, can be performed in other embodiments.

For example, in the above embodiment, the leading end of the sheet P is detected after the dirty area on the printing surface of the sheet P is detected. The dirty area on the printing surface of the sheet P may be detected after the leading end of the sheet P is detected. In that configuration, the dirty area may be present at an upstream side in the discharge direction from the sheet initial position of the sheet P. In that case, the conveyance amount required to convey the sheet P in the discharge direction can be reduced when the position of the sheet P is aligned with the printing start position after the leading end of the sheet P is detected.

The printing head 21 is not limited to the configuration in which an image is printed on the printing surface of the sheet P conveyed through the conveyance route 17 by the thermal-transfer system. The printing head 21 may have a configuration in which an image is printed in accordance with an electrophotographic system. Or, the printing head 21 may have a configuration in which an image is printed in accordance with an ink-jet system.

The above embodiment is an example in which the CPU 34 of the label printer 1 executes a variety of processing. However, the ASIC 31 may include multiple CPU, and multiple CPU may cooperate with each other to execute a variety of processing.

In the above configuration, various changes or modifications in the design may be made without departing from the claims.

What is claimed is:

1. A printing apparatus, comprising:
    a casing having a discharge opening and a conveyance route connected to the discharge opening;
    a roller located in the casing and configured to convey a sheet along the conveyance route;
    a driving source configured to drive the roller;
    a printing head facing the sheet positioned in the conveyance route;
    a scanner facing the conveyance route at a downstream from the printing head in a discharge direction in which the sheet is conveyed toward the discharge opening along the conveyance route, and configured to scan a printing surface of the sheet; and
    a controller configured to, in response to a printing preparation command,
        detect a leading-end position of the sheet,
        identify an error position in which at least one of printing or damage is present on the printing surface of the sheet in a case that scan data obtained by the scanner include data corresponding to the at least one of printing or damage,
        control the driving source to drive the roller to convey the sheet in the discharge direction until the error position reaches a downstream position from the printing head, and
        control the printing head to execute printing of an image on the sheet, after the sheet is conveyed in the discharge direction until the error position reaches the downstream position from the printing head.

2. The printing apparatus according to claim 1, further comprising a memory,
    wherein the identifying the error position comprises;
        controlling the driving source to drive the roller in a first direction to convey the sheet in the discharge direction,
        controlling the scanner to scan the printing surface of the sheet to obtain first scan data while the roller is driven in the first direction,
        detecting based on the first scan data whether the at least one of the printing or the damage is present on the printing surface of the sheet, and
        associating a detection result obtained from the first scan data with position information specifying a position of a detection target area of the first scan data and controlling the memory to memorize the detection result associated with the position information.

3. The printing apparatus according to claim 2, wherein the detection of the leading-end position of the sheet comprises:
    controlling the driving source to drive the roller in a second direction to convey the sheet in a direction opposite to the discharge direction;
    controlling the scanner to scan the printing surface of the sheet to obtain second scan data, after the roller is driven in the second direction;
    detecting the leading-end position of the sheet based on the second scan data; and stopping driving of the roller in the second direction in a case that the leading-end position of the sheet is detected.

4. The printing apparatus according to claim 3, wherein the driving of the driving source in which the sheet is conveyed in the discharge direction until the error position reaches the downstream position from the printing head comprises:

controlling the driving source to drive the roller in the first direction until an end edge at a most downstream side in the discharge direction of a blank area having no printing and no damage of the sheet reaches a printing position of the printing head, based on the detection result and the position information memorized in the memory; and stopping the driving of the roller in the first direction.

5. The printing apparatus according to claim 4, wherein the controller determines whether the printing surface of the sheet includes the error position after detecting the leading-end position of the sheet.

6. The printing apparatus according to claim 4, wherein the controller detects the leading-end position of the sheet after determining whether the printing surface of the sheet includes the error position.

7. The printing apparatus according to claim 6, wherein, in a case that the controller detects the leading-end position of the sheet after determining whether the printing surface of the sheet includes the error position, the controller is configured to:

detect the leading-end position of the sheet based on the second scan data while the sheet is conveyed in the direction opposite to the discharge direction from a position of the sheet in a case that the printing preparation command is received; and associate a detection result obtained from the second scan data with position information specifying a position of a detection target area and controlling the memory to memorize the detection result associated with the position information.

8. The printing apparatus according to claim 7, wherein, in a case that the controller controls the memory to memorize a detection result indicating that the at least one of the printing or the damage is present on the sheet, the controller is configured to:

control the memory to memorize a position of a upstream end in the discharge direction of an area having the at least one of the printing or the damage as position information;

determine based on the first scan data whether the sheet is a label sheet having a plurality of printing areas arranged in the discharge direction or a continuous sheet not having the printing areas, control the memory to memorize a distance between end edges in the discharge direction of two of the printing areas adjacent to each other as area information, in a case that the sheet is the label sheet, and control the memory to memorize a length in the discharge direction of the area having the at least one of the printing or the damage as the area information, in a case that the sheet is the continuous sheet.

9. The printing apparatus according to claim 7, wherein the controller determines, based on the first scan data and the second scan data, whether the at least one of the printing or the damage is present on the sheet based on a proportion or a percentage of a pixel included in the detection target area and exceeding a predefined density value.

10. The printing apparatus according to claim 7, wherein the controller controls the printing head to execute printing of a mark indicating that the area having the at least one of the printing or the damage of the sheet is unusable, based on the detection result and the position information memorized in the memory.

11. The printing apparatus according to claim 7, wherein the controller is configured to:

detect a position in a width direction orthogonal to the discharge direction of the sheet in the conveyance route, based on the first scan data or the second scan data, and control the printing head to execute printing of an image based on a detection result about the position in the width direction so that a center portion in the width direction of the sheet overlaps with a center portion in the width direction of an area to be subjected to the printing of the image.

12. The printing apparatus according to claim 7, wherein, in a case that the controller controls the driving source to drive the roller in the second direction, the controller is configured to decrease a driving speed of the roller in the second direction after a portion of the sheet that is positioned at a scanning position of the scanner in the case that the driving of the roller in the first direction starts returns to the reading position.

13. The printing apparatus according to claim 7, wherein the controller controls the driving source to drive the roller in the first direction in a case that a driving amount in the discharge direction has reached a predefined driving amount, and the predefined driving amount is an amount required for at least an area, which is determined to have the at least one of the printing or the damage, of the sheet to pass the scanner.

\* \* \* \* \*